US010024347B2

(12) United States Patent
Bertrand et al.

(10) Patent No.: US 10,024,347 B2
(45) Date of Patent: Jul. 17, 2018

(54) LOCKING TELESCOPING ROD

(71) Applicant: LIBERTY HARDWARE MFG. CORP., Winston-Salem, NC (US)

(72) Inventors: Stephen Bertrand, Stoney Point, NC (US); James Leroy Daniels, Stokesdale, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 393 days.

(21) Appl. No.: 14/336,187

(22) Filed: Jul. 21, 2014

(65) Prior Publication Data

US 2016/0017906 A1     Jan. 21, 2016

(51) Int. Cl.
    *F16B 7/10*     (2006.01)
    *F16B 7/14*     (2006.01)

(52) U.S. Cl.
    CPC ..... *F16B 7/1427* (2013.01); *Y10T 403/32501* (2015.01)

(58) Field of Classification Search
    CPC ...... F16B 7/1427; F16B 7/149; F16B 7/1418; F16B 7/14; Y10T 403/32501; Y10T 403/7011; Y10T 403/7009
    See application file for complete search history.

(56) References Cited

U.S. PATENT DOCUMENTS

| | | | | |
|---|---|---|---|---|
| 527,273 A | | 10/1894 | Fowler et al. | |
| 1,031,927 A | * | 7/1912 | Haskins | E04C 5/165 403/305 |
| 1,844,382 A | * | 2/1932 | Dardelet | F16B 37/0807 285/92 |
| 2,284,847 A | * | 6/1942 | Raymond | G03B 17/12 359/827 |
| 2,665,930 A | * | 1/1954 | Stanley | F16C 35/063 384/542 |
| 3,073,632 A | * | 1/1963 | Grunbaum | B65H 54/54 242/571.7 |
| 3,259,407 A | * | 7/1966 | Welt | F16B 7/1427 403/350 |
| 3,419,227 A | * | 12/1968 | McCarthy | B65H 75/08 242/571.6 |
| 3,419,293 A | * | 12/1968 | Conrad | F16B 7/1427 285/302 |
| 3,515,418 A | * | 6/1970 | Nielsen, Jr. | A61B 5/021 248/188.5 |

(Continued)

*Primary Examiner* — Josh Skroupa
*Assistant Examiner* — Matthew R McMahon
(74) *Attorney, Agent, or Firm* — Brooks Kushman P.C.

(57) ABSTRACT

A telescoping rod is adjustable to a range of household environments and includes a first tubular member defining a primary axis. A cam body is secured to an end of the first tubular member, and the cam body defines ramped outer surfaces that vary in distance from the primary axis as a function of angular position about the axis. A second tubular member is sized to slide over the first tubular member and the cam body. The rod also includes a first cam sleeve and a second cam sleeve disposed about the ramped outer surfaces of the cam body. Rotation of the second tubular member about the primary axis relative to the cam body causes the first and the second cam sleeves to exert outward forces against an inner surface of the second tubular member that are applied at substantially different angles relative to each other.

16 Claims, 5 Drawing Sheets

(56) References Cited

U.S. PATENT DOCUMENTS

| | | | | |
|---|---|---|---|---|
| 3,667,788 A * | 6/1972 | Greenwood | F16B 7/1427 | 285/148.27 |
| 4,076,437 A * | 2/1978 | Mazzolla | F16B 7/1427 | 248/411 |
| 4,294,560 A * | 10/1981 | Larkin | F16B 7/1427 | 248/411 |
| 4,419,026 A | 12/1983 | Leto | | |
| 4,585,367 A * | 4/1986 | Gall | A63B 21/0728 | 403/104 |
| 4,632,437 A * | 12/1986 | Robson | F16L 37/101 | 285/243 |
| 4,632,597 A * | 12/1986 | Clausen | F16B 7/1427 | 248/412 |
| 4,782,845 A * | 11/1988 | Chou | A45B 9/00 | 135/75 |
| 4,824,302 A * | 4/1989 | Schultheis | B60P 7/15 | 211/105.3 |
| 5,011,408 A * | 4/1991 | Nakanishi | A61C 1/141 | 433/127 |
| 5,336,012 A * | 8/1994 | Newville | A46B 11/063 | 16/429 |
| 5,348,240 A * | 9/1994 | Carmo | B65H 75/28 | 242/401 |
| 5,407,295 A * | 4/1995 | Kuhl | F16B 2/14 | 403/343 |
| 5,487,529 A * | 1/1996 | Newville | A46B 11/063 | 239/281 |
| 5,549,407 A * | 8/1996 | Levi | F16B 7/1427 | 403/109.5 |
| 5,692,856 A * | 12/1997 | Newman, Jr. | B25G 1/04 | 403/109.5 |
| 5,769,104 A * | 6/1998 | Uemura | F16B 7/1427 | 135/69 |
| 6,550,728 B1 * | 4/2003 | Fuhrman | A47B 9/02 | 108/146 |
| 6,571,426 B2 | 6/2003 | Chen | | |
| 6,761,501 B1 * | 7/2004 | Nakatani | F16B 7/14 | 403/109.2 |
| 7,407,337 B2 * | 8/2008 | Tella | F16D 1/072 | 348/345 |
| 7,534,067 B2 * | 5/2009 | Chiodo | F16B 7/042 | 324/321 |
| 8,043,020 B2 | 10/2011 | Peng | | |
| 8,505,129 B2 | 8/2013 | Parker et al. | | |
| 8,505,749 B2 | 8/2013 | Trettin et al. | | |
| 8,533,912 B2 | 9/2013 | Tran | | |
| 8,544,661 B1 | 10/2013 | Melino, Sr. et al. | | |
| 8,696,229 B2 | 4/2014 | Tran | | |
| 2009/0274511 A1 | 11/2009 | Chen | | |
| 2011/0284484 A1 * | 11/2011 | Lin | A47B 96/1425 | 211/45 |
| 2012/0005823 A1 | 1/2012 | Baines | | |
| 2012/0284914 A1 | 11/2012 | Bauer | | |
| 2012/0285914 A1 | 11/2012 | Carney | | |
| 2013/0092203 A1 | 4/2013 | Zaltron | | |
| 2013/0112639 A1 | 5/2013 | Baines | | |
| 2013/0198948 A1 | 8/2013 | Zeng | | |
| 2013/0198949 A1 | 8/2013 | Hai | | |
| 2013/0322956 A1 | 12/2013 | Montalto et al. | | |
| 2013/0322957 A1 | 12/2013 | Conrad | | |
| 2013/0334156 A1 | 12/2013 | Baines | | |

* cited by examiner

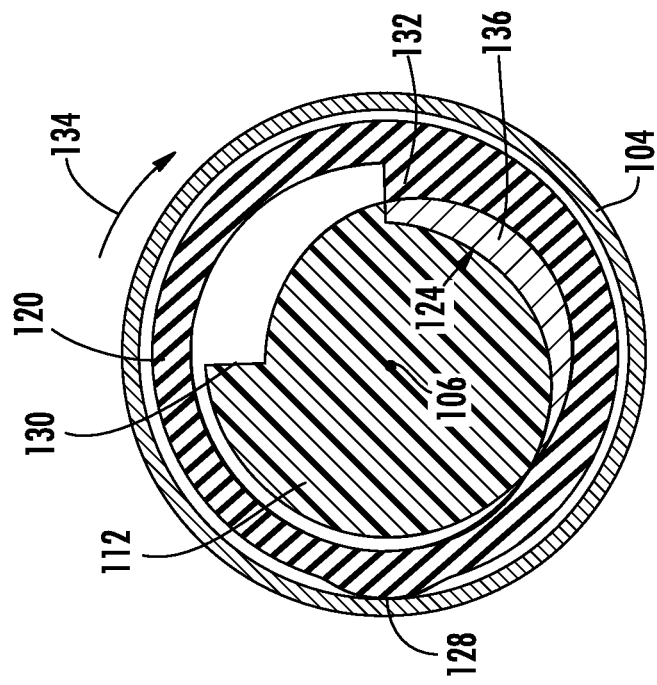
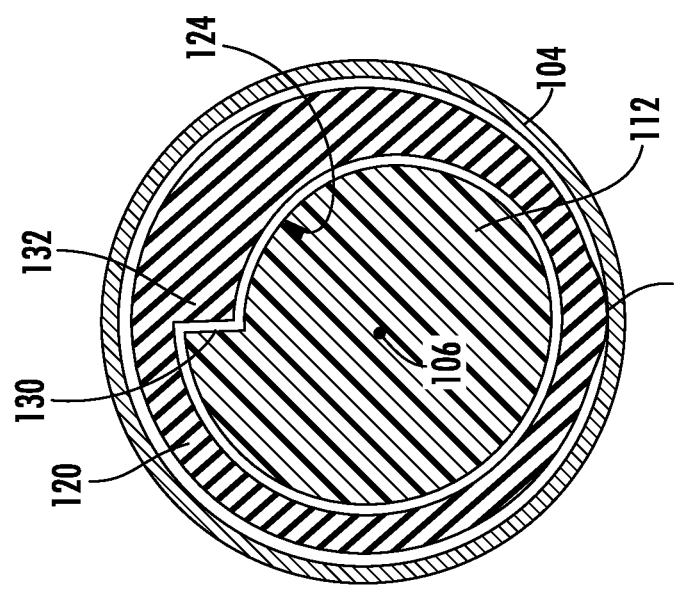

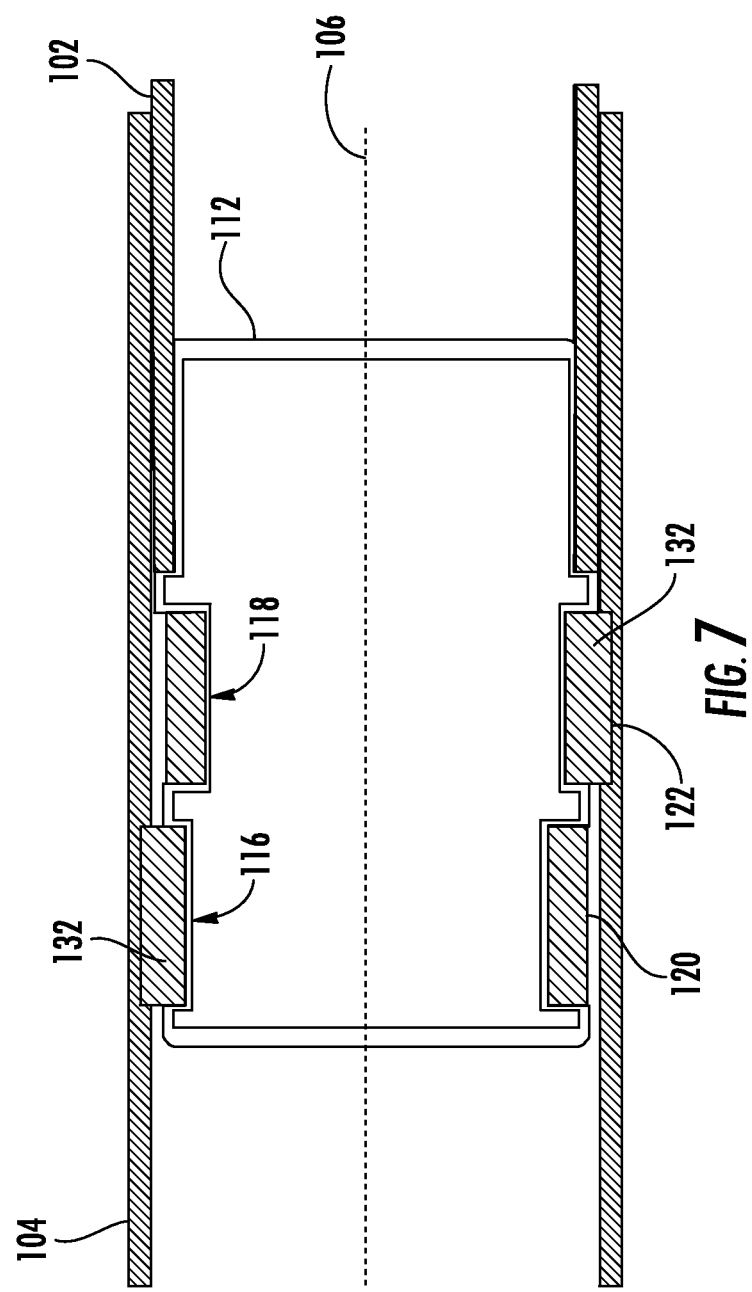

LOCKING TELESCOPING ROD

TECHNICAL FIELD

The present disclosure relates to a tubular rod having a selectively adjustable length for accommodating household articles.

BACKGROUND

Elongate mounting members may be mounted or positioned in different locations as desired by a user. Such devices are suitable to accommodate various household articles. However, the corresponding environments that require mounting members can vary widely in both dimensions and orientation. A convenient way to adjust a length of a mounting member may ease the burden imposed upon a user when mounting in different environments.

SUMMARY

In at least one embodiment, a telescoping rod is adjustable to a range of household environments and includes an elongate first tubular member defining a primary axis. A cam body is secured to an end of the first tubular member, and has a first cam slot and an adjacent second cam slot. The telescoping rod also includes a first elastomeric sleeve disposed about the cam body in the first cam slot, and a second elastomeric sleeve disposed about the cam body in the second cam slot. The telescoping rod further includes an elongate second tubular member sized to receive the first tubular member and cam body within an internal cavity to engage the first and second elastomeric sleeves. A rotation of the second tubular member to a locked position relative to the cam body causes an outward radial force from the first and the second elastomeric sleeves against an internal surface of the second tubular member to resist axial translation of the second tubular member relative to the cam body.

In at least one embodiment, a telescoping rod is adjustable to a range of household environments and includes a first tubular member defining a primary axis. A cam body is secured to an end of the first tubular member, and the cam body defines ramped outer surfaces that vary in distance from the primary axis as a function of angular position about the axis. A second tubular member is sized to slide over the first tubular member and the cam body. The rod also includes a first cam sleeve and a second cam sleeve disposed about the ramped outer surfaces of the cam body. A rotation of the second tubular member about the primary axis relative to the cam body causes each of the first and the second cam sleeves to exert an outward force against an inner surface of the second tubular member. The ramped outer surfaces are arranged such that the outward force of the second cam sleeve is opposite of the outward force of the first cam sleeve.

In at least one embodiment, a telescoping rod is adjustable to a range of household environments and includes a first elongate tubular member. A second elongate tubular member is adapted to longitudinally translate over the first tubular member to adjust an overall length of the telescoping rod. A cam body is affixed to an end of the first tubular member, where the cam body defines an asymmetric ramped surface. The telescoping rod also includes an elastomeric sleeve having a closed section and disposed about the ramped surface of the cam body. An outer shape of the ramped surface causes the elastomeric sleeve to deform in response to a rotation about the cam body, thereby causing a first outward radial force upon an inner surface of the second tubular member. The radial force restricts longitudinal translation of the second tubular member relative to the first tubular member.

BRIEF DESCRIPTION OF THE DRAWINGS

FIG. 5 is a cross-sectional view along line 5-5 of FIG. 3 of the telescoping rod in an unlocked position.

FIG. 6 is a cross-sectional view along line 5-5 of FIG. 3 of the telescoping rod in a locked position.

FIG. 7 is a cross-sectional view along line 7-7 of FIG. 3 of the telescoping rod in a locked position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
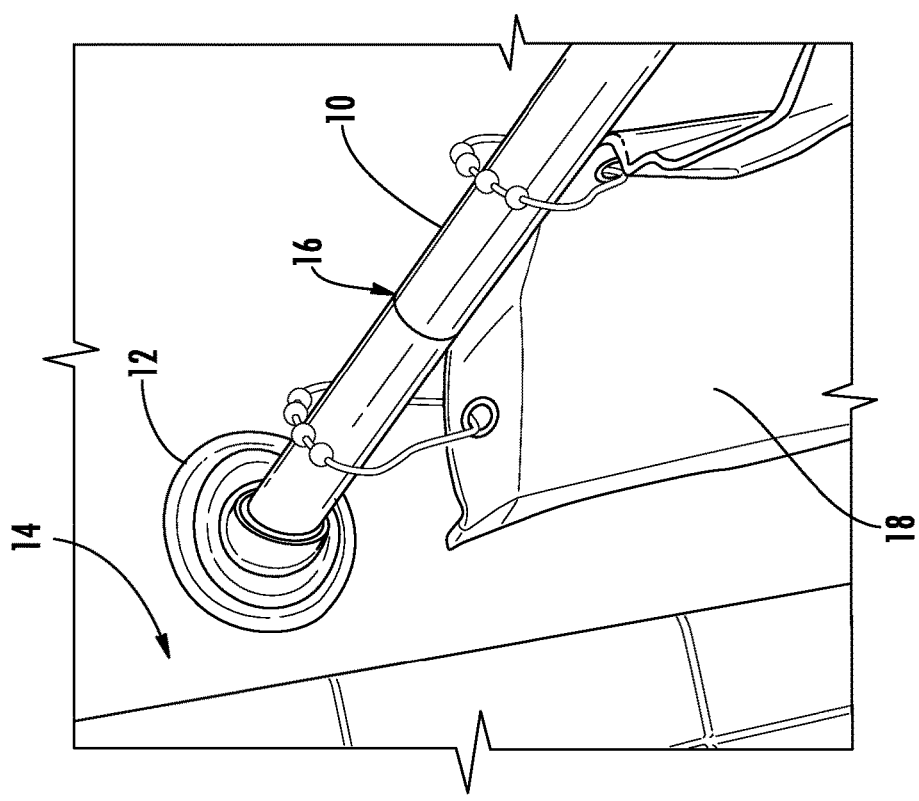
FIG. 1 is a cutaway elevation view of an adjustable length shower curtain rod.

Several household applications, such as kitchen and bathroom hardware, may benefit from the telescoping rod of the present disclosure. A number of particular uses require a horizontal positioning of an adjustable tubular member. For example, FIG. 1 depicts a cutaway view of an adjustable length shower rod 10. The shower curtain rod 10 includes a first end portion 12 that interfaces with a vertical wall 14 of a shower opening. A second end portion (not shown) interfaces with an opposing vertical wall of the shower opening. The rod includes an adjustable portion 16 that allows the length of the rod 10 to be customized in length to conform to a range of shower opening dimensions. Once the rod 10 is conformed to a particular shower opening size, a correspondingly sized shower curtain 18 may be hung from the rod 10. In additional embodiments, a window curtain rod may similarly be customized in length to fit a range of different window opening sizes. Aspects of the present disclosure provide a user-friendly, convenient adjustment to various tubular members.

Figure 2:
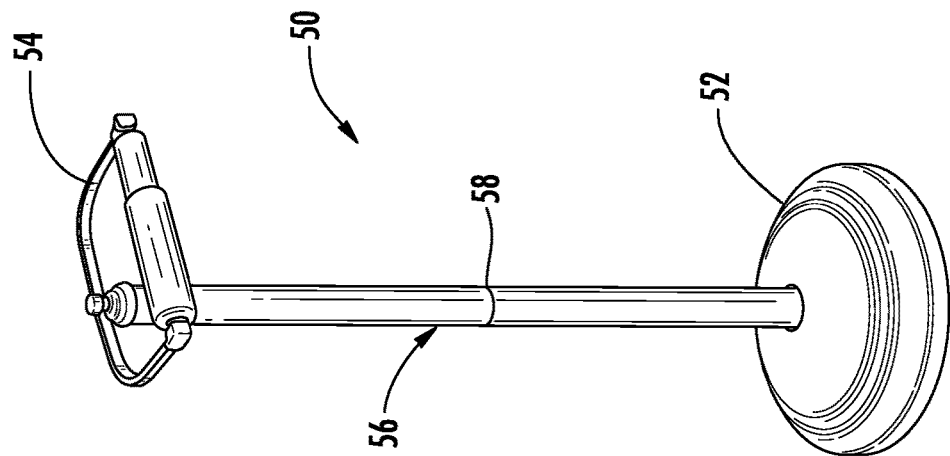
FIG. 2 is an elevation view of an adjustable height pedestal toilet paper holder.

Referring to FIG. 2, certain household hardware applications require vertical adjustment. By way of example, a pedestal toilet paper holder 50 is depicted having an adjustable height. The toilet paper holder 50 includes a base 52 that is weighted and configured to rest on a horizontal surface such as a floor. The toilet paper holder 50 also includes an upper dispensing portion 54 to retain a roll of toilet paper. Depending on the user placement, it may be desirable to adjust the height of the dispensing portion 54. The toilet paper holder 50 includes a telescoping tubular portion 56 between the base 52 and dispensing portion 54. Specifically, a locking mechanism 58 may be selectively engaged to fix the dispensing portion 54 at a desired height from the base 52. In additional embodiments, smaller pedestal mounted rods having an adjustable height may be placed at higher locations, such as a counter top.

In further additional embodiments, locking telescoping rods may be suitable for applications requiring vertical floor to ceiling contact. For example, a shelving unit may include a vertical main telescoping tube affixed between upper and lower horizontal surfaces. The shelving unit may also include shelves extending laterally from the main telescoping tube at intermediate positions along the length.

Figure 3:
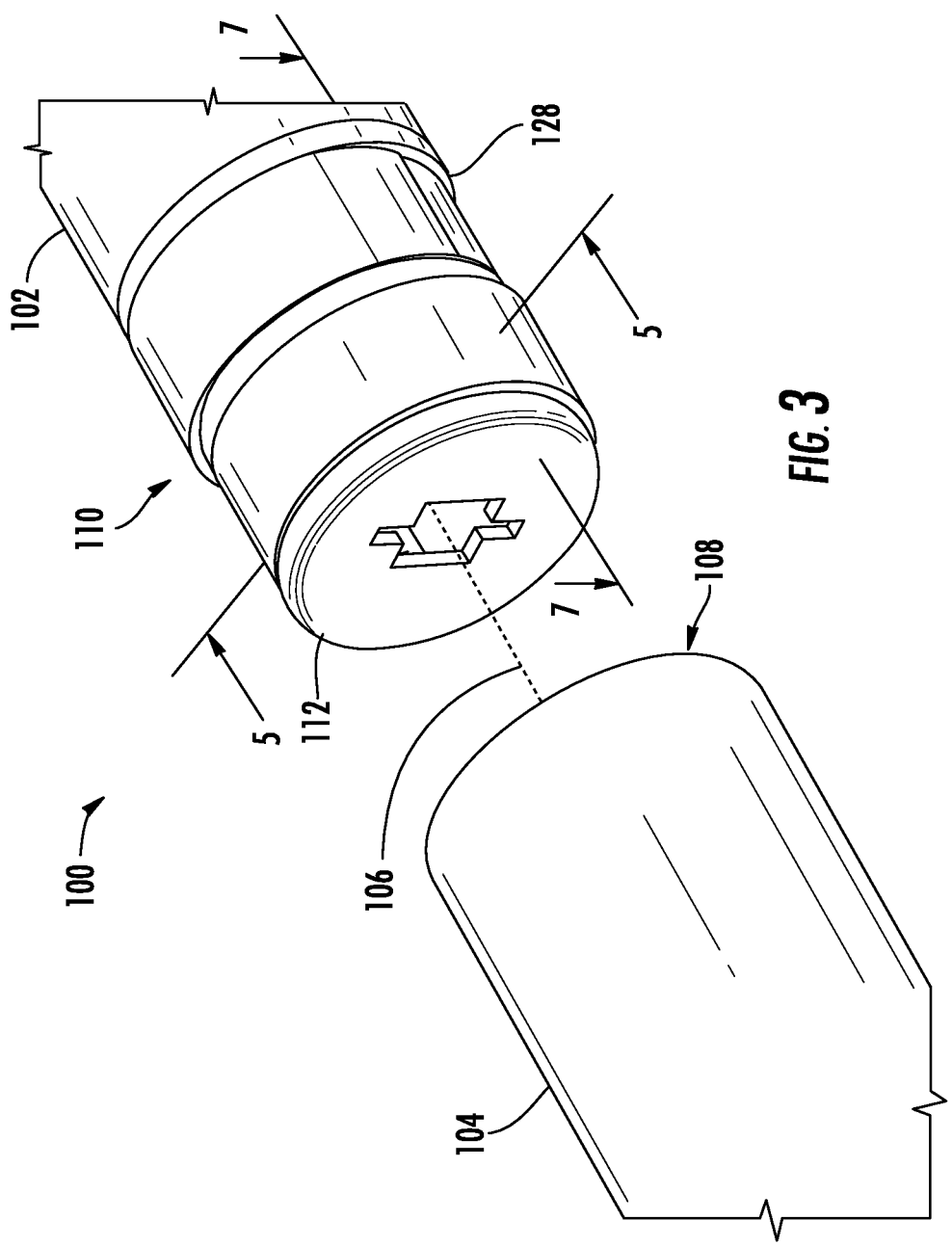
FIG. 3 is a perspective view of a locking telescoping rod.

FIG. 3 depicts a locking mechanism of a telescoping rod 100 capable of extending and retracting over a range of lengths as desired by a user. The telescoping rod 100 of FIG. 3 is shown separated, where a fixed first tubular member 102 is detached from a movable second tubular member 104. Each of the first tubular member 102 and the second tubular member 104 are elongate and have a hollow inner cavity. The first tubular member 102 also defines a primary axis 106. The second tubular member 104 defines a diameter of an internal cavity 108 that is greater than an outer diameter of the first tubular member 102. The second tubular member 104 is large enough to slide over the first tubular member 102 along the direction of the primary axis 106. When both tubular members are combined, an overall length of the rod 100 may be extended or collapsed by longitudinally translating the second tubular member 104 relative to the first tubular member 102.

The rod 100 is further provided with a cam locking mechanism 110 to selectively restrict axial movement of the second tubular member 104 relative to the first tubular member 102. The cam locking mechanism 110 includes a cam body 112 having two adjacent cam slots. Each of the cam slots includes a ramped surface with a distance from the primary axis 106 that varies as a function of angular position around the cam body 112. In at least one embodiment, the cam body is provided with at least one asymmetric ramped surface relative to the primary axis 106. The cam body 112 is inserted into an inner cavity 114 of the first tubular member 102. The cam body 112 may be affixed within the inner cavity 114 by a number of retaining methods. For example, the cam body 112 may be press fit, adhesively bonded, or staked with protrusions or formations of the first tubular member 102.

Figure 4:
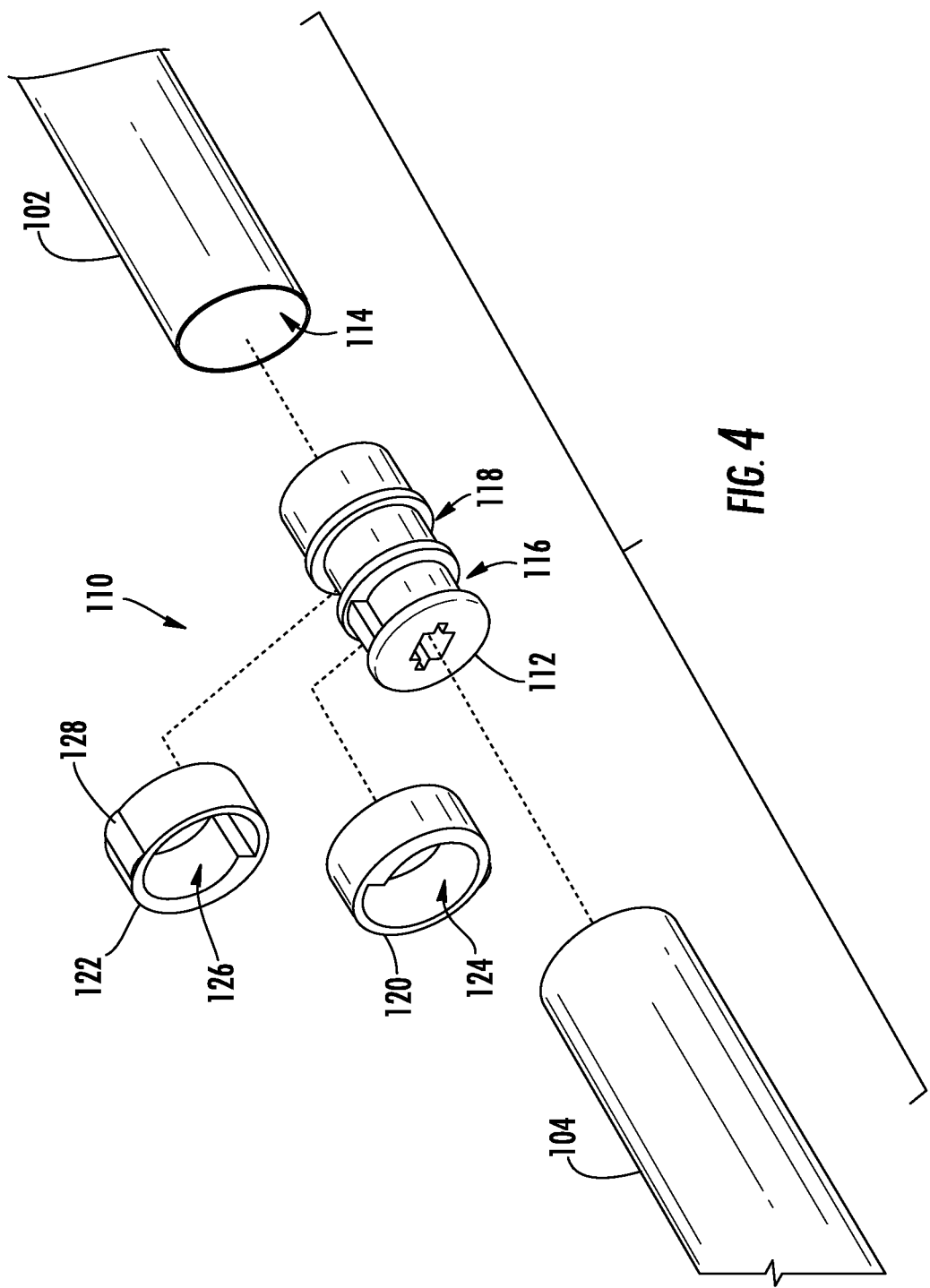
FIG. 4 is an exploded perspective view of the telescoping rod of FIG. 3.

FIG. 4 is an exploded perspective view showing components of the cam locking mechanism further separated. As discussed above, the cam body 112 is provided with a first cam slot 116 and a second cam slot 118. A first cam sleeve 120 and a second cam sleeve 122 are disposed about the cam body 112 and correspond to the first cam slot 116 and the second cam slot 118, respectively. The first cam sleeve 120 includes a first inner surface 124, and the second cam sleeve 122 includes a second inner surface 126. The cam sleeves each have a closed cross section, and each inner surface defines a shape that corresponds to the outer surfaces of the first cam slot 116 and the second cam slot 118. In at least one embodiment, the cam sleeves are elastomeric sleeves formed from a flexible, closed section elastomeric material.

FIGS. 5 and 6 are cross sectional views along line 5-5 of FIG. 3. The cross sections are cut through the first cam slot 116 of the cam body 112. Although the first cam slot 116 is depicted, it is understood that the mechanics of the components at the second cam slot 118 behave in a similar fashion. One example shape of the ramped surface of the cam body 112 may be seen in the sectional view. As discussed above, the distance from the center, or primary axis 106, to the outer surface of the cam body 112 varies as a function of angular position around the cam body 112.

FIG. 5 depicts the second tubular member and elastomer cam sleeve in the first unlocked position. In first position, the inner surface 124 of the cam sleeve 120 is oriented to align with the shape of the cam body 112. The corresponding shapes of the elastomer cam sleeve 120 and the ramp surface of the cam body nest relative to each other, and there is little outward pressure applied to the inner surface of the second tubular member 104. In this way, the second tubular member is allowed to translate longitudinally along the primary axis.

The cam sleeve 120 is provided with a friction protrusion 128 on an outer portion to interact with the inner surface of the second tubular member 104 at all times. The friction protrusion 128 creates a stable baseline amount of persistent contact between the second tubular member 104 and the cam sleeve 120. The contact in turn creates a frictional resistance to limit relative slip between the second tubular member 104 and the cam sleeve 120. In this way rotation of the tubular member 104 forces concurrent rotation of the cam sleeve 120 about the cam body 112. In at least one embodiment, the coefficient of friction between the cam sleeve 120 and the cam body 112 is less than the coefficient of friction between the cam sleeve 120 and the inner surface of the second tubular member 104. This helps to ensure that the cam sleeve 120 rotates along with the second tubular member 104 relative to the cam body 112. In further embodiments, different surface treatments are applied to the inner and outer surfaces of the cam sleeve to influence the relative sliding conditions at each interface. In additional further embodiments, the cam sleeve may be a multi-material combination including a first inner slip material and a second outer slip-resistant material.

Still referring to FIG. 5, a first angular position is defined. One direction of rotation is limited by a protrusion, or stop wall 130 of the cam body 112. The cam sleeve 120 includes a corresponding thicker portion 132 that nests in the shape adjacent the stop wall 130 in the first unlocked position. In the example depicted in FIG. 5, the stop wall 130 is adjacent to a peak distance between the ramped surface and the primary axis 106. This configuration inhibits further counterclockwise rotation of the second tubular member 104 and cam sleeve 120. Restriction of movement in the one direction helps to create user error proofing. A user is able to tactically feel the allowable direction of rotation from the difference in the magnitude of resistive forces corresponding to each direction. In the configuration shown in FIG. 5, the cam sleeve 120 and second tubular member 104 are adapted to rotate in a clockwise direction.

FIG. 6 depicts the second tubular member and cam sleeve in a locked position. When the second tubular member 104 is rotated about the primary axis 106 relative to the cam body 112, the friction protrusion causes the first cam sleeve 120 to also be rotated. In the cross sectional view of FIG. 6, the direction of rotation is clockwise and indicated by arrow 134. The inner surface 124 of the cam sleeve 120 is misaligned with respect to the shape of the cam body 112 in the locked position. The thicker portion 132 of the cam sleeve 120 is rotated, and in response causes a material interference 136 between the cam sleeve 120 and the cam body 112. FIG. 6 shows the interference and reflects the cam sleeve 120 as undeflected. In practice, the interference 136 causes portions of the cam sleeve 120 to deform outwardly. The bulge or outward expansion created by the stacking of additional material creates an outward radial force from the cam sleeve 120 against the internal surface of the second tubular member 104. The resulting force in turn provides increased frictional resistance to prevent translation of the second tubular member 104 along the primary axis 106 relative to the cam body 112.

Aspects of the present disclosure allow a user to selectively engage and disengage the locking mechanism 110 by rotating the second tubular member 104 relative to the first tubular member. In at least one embodiment, there is about a 90 degree rotational difference between the first unlocked position and the second locked position of the second tubular member 104. Rotation from the unlocked position to the locked position causes the outward forces discussed above. Conversely, a counter-rotation from the locked position to the unlocked position reduces the outward forces to substantially zero allowing easy relative adjustment between the tubular members. A user is thereby provided with a quick and ergonomically conducive way to engage and disengage the locking mechanism 110.

Referring to FIG. 7, a cross section along line 7-7 of FIG. 3 shows the positions of the first cam sleeve 120 relative to the second cam sleeve 122. The cam locking mechanism 110 is depicted in the locked position. The first cam slot 116 is provided with a different angular position relative to the adjacent second cam slot 118. In at least one embodiment, the second cam slot 118 may be rotated by about 180 degrees relative to the primary axis 106 compared to the first cam slot 116. The staggered arrangement between the two cam surfaces positions the thicker portion 132 corresponding to each cam sleeve at diametrically opposite positions relative to each other. The opposing orientations relative to the primary axis 106 cause the corresponding forces to be created in opposing directions. In this case the locking cam feature thereby exerts counter-balanced loads. Also, the tubular members are better stabilized by the longitudinal spacing of the contact points of the elastomer cam sleeves. Further, a configuration including multiple cam sleeves increases the overall amount of longitudinal friction provided to lock the position of the tubular members relative to each other. Although diametrically opposing direction outward radial forces are shown by way of example, multiple forces applied at a substantially different angle relative to each other may provide similar locking mechanics.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A telescoping rod adjustable to a range of household environments comprising:
   an elongate first tubular member defining a primary axis;
   a cam body secured to an end of the first tubular member having a first cam slot and an adjacent second cam slot;
   a first elastomeric sleeve disposed about the cam body in the first cam slot;
   a second elastomeric sleeve disposed about the cam body in the second cam slot; and
   an elongate second tubular member sized to receive the first tubular member within an internal cavity and engage the first and second elastomeric sleeves, wherein a rotation of the second tubular member to a locked position relative to the cam body causes the cam body to engage and to elastically deform the first and second elastomeric sleeves, the elastomeric sleeves thereby exerting an outward radial force from the first and the second elastomeric sleeves against an internal surface of the second tubular member to resist axial translation of the second tubular member relative to the cam body;
   wherein the cam body includes asymmetric ramped cam surfaces in each of the first and second cam slots such that when the first and the second elastomeric sleeves are rotated about the primary axis, the elastomeric sleeves engage the ramped cam surfaces to cause a material interference which elastically deforms the first and second elastomeric sleeves and thereby exerts the outward radial force on the internal surface of the second tubular member; and
   wherein the first elastomeric sleeve and the second elastomeric sleeve are formed from a closed cross-section.

2. The telescoping rod of claim 1 wherein the outward radial force from the first elastomeric sleeve is diametrically opposed to the outward radial force from the second elastomeric sleeve.

3. The telescoping rod of claim 1 wherein a rotation of the second tubular member relative to the cam body to an unlocked position reduces the outward radial force from the first and second elastomeric sleeves to substantially zero to allow axial translation of the second tubular member relative to the cam body.

4. The telescoping rod of claim 1 wherein the first and the second elastomeric sleeves include a protrusion on an external surface to contact the second tubular member in the locked position and in an unlocked position.

5. The telescoping rod of claim 1 wherein a coefficient of friction between the elastomeric sleeves and the second tubular member is greater than the coefficient of friction between the elastomeric sleeves and the cam body.

6. The telescoping rod of claim 1 wherein each of the first cam slot and the second cam slot defines an asymmetric ramped surface that varies in distance from the primary axis as a function of an angular position around the cam body.

7. A telescoping rod adjustable to a range of household environments comprising:
   a first tubular member defining a primary axis;
   a cam body secured to an end of the first tubular member, the cam body defining asymmetric ramped outer surfaces that vary in distance from the primary axis as a function of angular position about the primary axis;
   a second tubular member sized to slide over the first tubular member and the cam body;
   a first cam sleeve disposed about the asymmetric ramped outer surfaces of the cam body; and
   a second cam sleeve disposed about the asymmetric ramped outer surfaces of the cam body, wherein a rotation of the second tubular member about the primary axis relative to the cam body causes each of the first and the second cam sleeves to generate an outward force against an inner surface of the second tubular member, and wherein the outward force of the second cam sleeve is opposed to the outward force of the first cam sleeve;
   wherein the cam body includes first and second slots each having an asymmetric ramped outer surface, wherein the first and second slots are oriented so that the asymmetric ramped outer surfaces are positioned diametrically opposite to each other; and
   wherein the first cam sleeve and the second cam sleeve are formed from a closed cross-section of elastomeric material and elastically deform to exert the outward radial force.

8. The telescoping rod of claim 7 wherein the first and second cam sleeves are operatively connected to the second tubular member so the rotation of the second tubular member causes a concurrent rotation of the first and second sleeves wherein the asymmetric ramped surfaces interfere with a cam sleeve surface in response to the rotation of the second tubular member about the primary axis.

9. The telescoping rod of claim 7 wherein the asymmetric ramped outer surfaces of the cam body defines at least one stop wall to limit rotation of the second tubular member in one direction.

10. The telescoping rod of claim 7 wherein the first and second cam sleeves include a protrusion disposed on an outer sleeve surface to maintain friction contact with the inner surface of the second elongate tubular member so rotation of the second tubular member engages the protrusions and causes a concurrent rotation of the first and second cam sleeves, wherein a coefficient of friction between the cam sleeves and the second tubular member is greater than the coefficient of friction between the cam sleeves and the cam body.

11. The telescoping rod of claim 7 wherein a counter-rotation of the second tubular member relative to the cam body reduces the outward force from the first cam sleeve and the second cam sleeve to substantially zero to allow axial translation of the second tubular member relative to the cam body.

12. A telescoping rod adjustable to a range of household environments comprising:
a first elongate tubular member;
a second elongate tubular member adapted to longitudinally translate over the first tubular member to adjust an overall length of the telescoping rod; a cam body affixed to an end of the first tubular member, the cam body defining an asymmetric ramped surface; and
an elastomeric sleeve disposed about the ramped surface of the cam body, wherein the elastomeric sleeve deforms in response to a rotation about the cam body thereby causing a first outward radial force upon an inner surface of the second tubular member, and
wherein the radial force restricts longitudinal translation of the second tubular member relative to the first tubular member; and
further comprising a second elastomeric sleeve disposed about the cam body and adapted to, in response to rotation about the cam body, apply a second outward radial force against the inner surface of the second elongate tubular member at an angle that is substantially different from the first outward radial force; and
wherein the first elastomeric sleeve and the second elastomeric sleeve are formed from a closed cross-section of elastomeric material and elastically deform to exert the respective outward radial force.

13. The telescoping rod of claim 12 wherein the elastomeric sleeve is operatively connected to the second tubular member so the rotation of the second tubular member causes a concurrent rotation of the elastomeric sleeve and the cam body to engage and to elastically deform the elastomeric sleeve thereby exerting the outward radial force.

14. The telescoping rod of claim 12 wherein the ramped surface of the cam body varies in distance from a primary axis as a function of an angular position around the cam body, and wherein the cam body defines a stop wall adjacent to peak distance from the primary axis to limit rotation in one direction.

15. The telescoping rod of claim 12 wherein the elastomeric sleeve includes a protrusion disposed on an outer portion to maintain contact with the inner surface of the second elongate tubular member.

16. The telescoping rod of claim 15 wherein rotation of the second elongate tubular member engages the protrusion and causes a concurrent rotation of the elastomeric sleeve.

* * * * *